Aug. 29, 1944. C. J. CRANE ET AL 2,356,828
NAVIGATIONAL CONTROL MEANS
Filed Aug. 8, 1936 2 Sheets-Sheet 1

INVENTORS
Carl J. Crane
Raymond K. Stout
BY F. Bascom Smith
ATTORNEY.

Aug. 29, 1944.    C. J. CRANE ET AL    2,356,828
NAVIGATIONAL CONTROL MEANS
Filed Aug. 8, 1936    2 Sheets-Sheet 2

INVENTORS
Carl J. Crane
Raymond K. Stout
BY    F. Bascom Smith
ATTORNEY.

Patented Aug. 29, 1944

2,356,828

UNITED STATES PATENT OFFICE 2,356,828

NAVIGATIONAL CONTROL MEANS

Carl J. Crane, Fairfield, and Raymond K. Stout, Dayton, Ohio

Application August 8, 1936, Serial No. 95,042

13 Claims. (Cl. 172—282)

This invention relates to navigation and direction finding, and more particularly to apparatus for automatically controlling and indicating the course of a vehicle, such as an aeroplane or marine vessel.

In aerial and marine navigation, extensive use is made of radio direction finders or radio compasses. In most aeroplane installations, the navigator or pilot is informed by a suitable indicator, usually of the vertical reading, pointer type, operatively connected to the direction finder, when his craft is on course, or when it is to the right or to the left of the course. A loop or any suitable directional antenna, constituting a part of the direction finder, may be manually rotated by the navigator to determine, in a manner well understood in the art, the compass bearing of a transmitting station, which may be the ordinary non-directional type of radio transmitter, whereby the navigator can accurately determine his position along a particular course or line of bearing. In the event the vehicle carrying the direction finder is an aeroplane, for example, the navigator is constantly adjusting his controls, for long periods of time, in order to maintain the plane on the desired course.

Automatic mechanical pilots, such as gyro pilots, for example, have heretofore been employed for stabilizing and maintaining a vehicle on a predetermined course whereby the manual effort of the human pilot is materially reduced. These automatic pilots require manual adjustments from time to time, however, even after being set originally to the desired compass course. Changes in course require manual adjustment, and drift or set causes deviation of the vehicle from the true course, consequently the automatic pilot does not relieve the navigator of the necessity of close supervision. While navigating during periods of low visibility and employing a radio direction finder and an automatic pilot, this supervision becomes extremely important, since the navigator has no external visible means for directing himself back on course if he should not keep the vehicle directly on course according to the indication, either visual or aural, of his indicator.

One of the objects of the present invention is to so combine a radio direction finder and an automatic pilot that the vehicle provided with the novel combination will be automatically guided to or toward a selected radio transmitting station, whereby the human pilot or navigator is relieved of substantially all manual effort and supervision associated with the navigation of the vehicle.

Another object of the invention is to provide novel radio control means for actuating a controlled member, such as an automatic pilot control, or the loop antenna of a direction finder, for example.

Another object is to provide novel radio controlled means for rendering a source of electrical or pneumatic energy effective to actuate a control element in either of two directions.

Another object is to provide a novel method for navigating and controlling a vehicle, such as an aircraft, marine vessel, etc.

The above and other objects will appear more fully hereafter in the detailed description of the invention, which is to be read in connection with the accompanying drawings, wherein like reference characters refer to like parts throughout the several views. In the drawings, Fig. 1 is a diagrammatic view illustrating one form of novel means constituting the subject matter of the present invention for operatively connecting a radio direction finder or compass to a control member such as the control member of an automatic pilot, the illustration of the direction finder and pilot being omitted;

Generally speaking, the invention comprises the combination with a direction finder of electrical or pneumatic means, or both, controlled by the direction finder and adapted to control relay circuits, for example, the latter controlling a reversible motor for actuating a control member, such as an adjustment element of an automatic pilot for control in either of two directions, whereby substantially all manual effort on the part of the navigator or human pilot is eliminated in maintaining the ship or plane on a predetermined course, once the direction finder has been tuned to the desired station.

Figure 1:
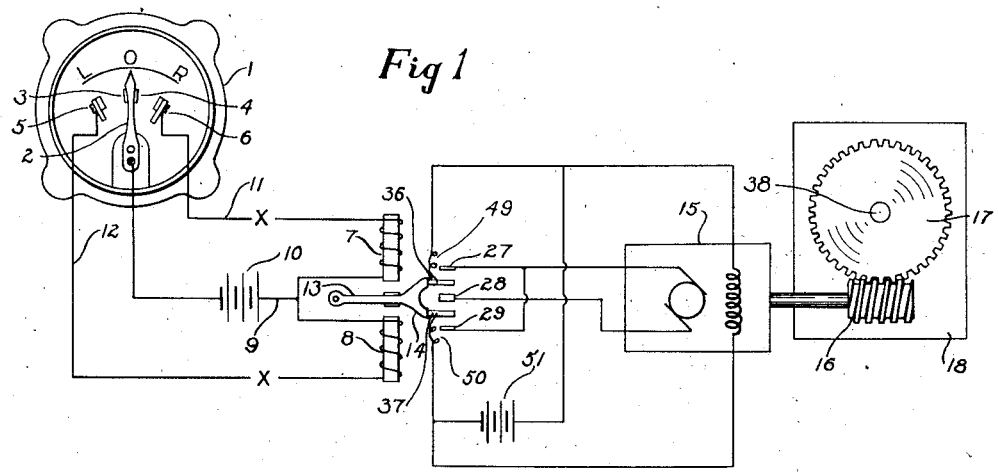

Referring now to the embodiment of the invention shown in Fig. 1, the mechanism comprises a right-left indicator 1 carrying a vertically reading pointer 2 which is operatively connected to the direction finder output in a manner well understood in the art. The direction finder may be of any suitable type well known in the art, and accordingly the same is not illustrated. When the direction finder is tuned to the selected transmitting station, and the vehicle, such as an aeroplane or ship, is on the predetermined course, the pointer reads zero, but any deviation of the vehicle to the right or left is immediately indicated by corresponding movement of the pointer.

As illustrated in Fig. 1, the pointer 2 is provided with laterally facing contacts 3 and 4 adapted to engage stationary contacts 5 and 6 suitably mounted on the casing of the indicator. Two electromagnetic relays 7 and 8 have their windings connected at their common end through conductor 9 to a source of power, such as battery 10, and indicator arm 2, and at their opposed ends to the conductors 11 and 12, respectively, for connection to contacts 5 and 6, respectively. The relay armature 13 carries a double-pole, double-throw switch 14, the moving contacts 36 and 37 of which are connected to battery 51 through suitable flexible leads 49 and 50. Stationary contacts 27, 28 and 29 of the switch 14 are connected to the armature of a suitable electric motor 15, the contacts of said switch and the associated leads being so arranged as to provide for reversing the direction of rotation of the motor armature. The armature shaft of motor 15 carries a worm gear 16, which engages a gear 17 of an instrument 18, said gear 17 being drivably secured to a member to be controlled, such as shaft 38. Instrument 18 may be an automatic pilot, in which case rotation of control member or shaft 38 in the desired direction is effective to cause the automatic pilot to shift the rudder or other control surface of the vehicle in a suitable direction to secure the desired change of the path of movement of the vehicle.

When the vehicle moves off course, the radio direction finder will indicate this movement by a deflection of the pointer 2 of the right-left indicator, in a manner that is well known. Assuming that the vehicle moves off course in such a direction as to cause the pointer to move to position "R," it will be seen that the circuit including relay 7 will be completed by the engagement of contacts 4 and 6, causing armature 13 to close the contacts 27 and 28 of switch 14, placing the battery 51 across the armature of the motor and causing rotation thereof in one direction. Rotation in this direction will operate upon gear 17 to cause the rudder or other control surface of the vehicle to be deflected in a manner to return the vehicle to the desired path. When on course, pointer 2 will return to neutral position, as shown in Fig. 1.

Alternatively, if the vehicle is off course on the other side, then the radio compass will cause the indicator 2 to be deflected to the "L" position and then the circuit containing relay 8 will be closed through engagement of contacts 3 and 5, causing the armature 13 to draw the moving contacts 36 and 37 of switch 14 into engagement with the stationary contacts 28 and 29, whereby the battery 51 is placed across the armature of motor 15 in such a way as to cause rotation of the motor in the opposite direction, thus operating upon gear 17 and shaft 38 to cause deflection of the rudder or other guiding member in the opposite direction.

While only one relay has been shown in circuit with each of the contacts 5 and 6, it is to be understood that other relays, more sensitive than relays 7 and 8, may be inserted at the points marked X, so that the contacts 5 and 6 may be made to carry only a small current while relays 7 and 8, operated by the more sensitive relays at X, may carry current adequate for holding the switch contacts closed.

Figure 2:
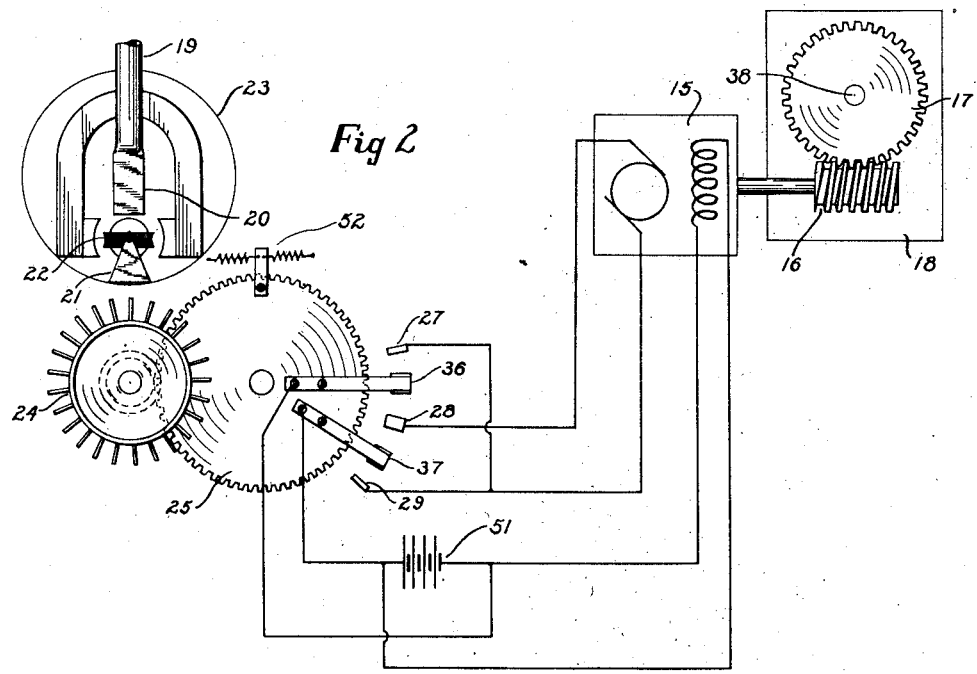
Fig. 2 is a diagrammatic view of a second embodiment of the invention, illustrating the use of sources of electrical and pneumatic energy for obtaining the desired control.

Fig. 2 shows an embodiment of the invention having an air line having a jet 20 for directing a stream of air over a vane 21 mounted upon the shaft of the pivotally mounted coil 22 of a radio compass galvanometer 23. Below the vane 21, and in such a position as to be in the path of air deflected from it, is the air turbine 24 which is connected to a wheel 25 through a suitable gear train. Wheel 25 carries contact arms 26 of a double-pole, double-throw switch for engaging the contacts 27 and 28, or 28 and 29, depending on the direction in which the switch arms are rotated.

This embodiment effects the same type change or correction of instrument 18 that is made by the arrangement shown in Fig. 1, but through a different means. A steady stream of air is caused to flow from a source, not shown, to which line 19 is connected, through jet 20 and over vane 21. The latter is positioned in a manner such that when galvanometer coil 22 is at rest, as shown, then air will be deflected in an equal amount over both inclined surfaces of the vane 21, and will impinge on the blades of the turbine 24 equally on both sides of the vane, with resultant zero motion of the turbine. However, when coil 22 moves, indicating movement of the vehicle off the desired path, more air will be directed to the blades on one side of the vane than the other, resulting in rotation of the turbine. Contacts 27 and 28, or 28 and 29, are closed, depending on the direction of the rotation of turbine 24, causing motor 15 to operate in the direction for making the proper adjustment of the instrument 18.

Resilient means 52, of any suitable type, may be provided for returning the wheel 25 and contacts 36, 37 to neutral or open position after proper correction has been effected in the instrument 18.

Figure 3:
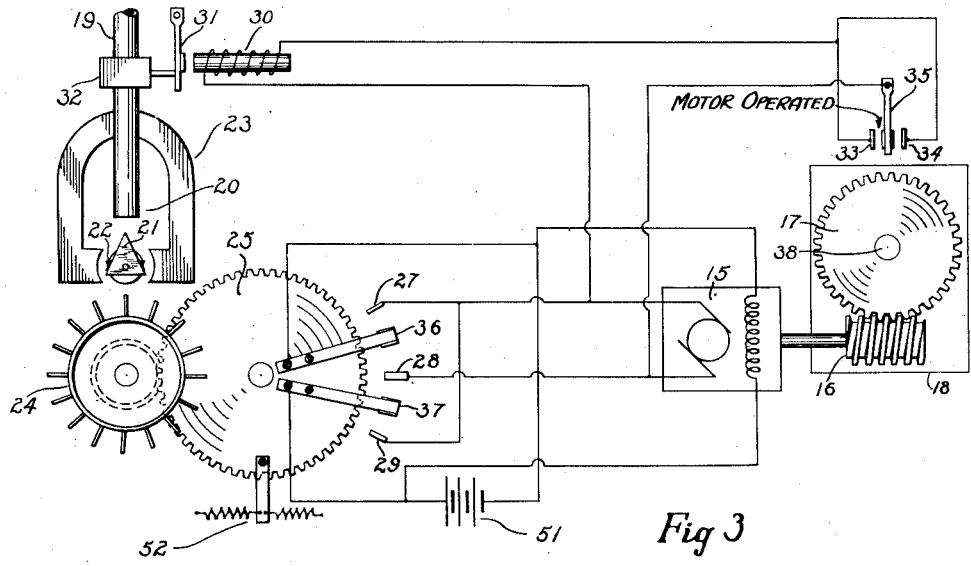
Fig. 3 is a view similar to Fig. 2, illustrating a third embodiment of the invention; and, Fig. 4 is a view, partly in perspective, and partly diagrammatic, illustrating still another embodiment of the invention operatively connected to an automatic pilot.

Fig. 3 shows another embodiment of the invention wherein radio controlled vane 21 is positioned differently, with respect to the shaft of the moving coil 22, from the showing of Fig. 2. As illustrated, vane 21 is fixed to the shaft of the coil 22 at a point considerably below the vertex of the vane, whereby a moment arm, measured from the point at which the coil shaft is fixed to the vane to the vertex of the vane, is obtained. This arrangement of vane 21 with respect to the coil shaft provides a highly satisfactory means for directing all the air delivered by the jet 20 to one side or the other of said vane in a manner to be set forth later.

In this embodiment of the invention, the air stream is interrupted periodically, in order to allow the vane to return to normal position if sufficient correction has been made by one deflection, or to permit the vane to assume any position to which the coil 22 directs it, unhampered by the air stream. The vane is so balanced, however, that if the air interrupting apparatus fails to stop the air flow, the torque of the galvanometer coil will, under normal conditions, be sufficient to overcome the force of the air, and thus move the vane, with slightly decreased sensitivity, to another corrective position.

The interruption of the air stream may be provided for in a variety of ways, one of which is illustrated in Fig. 3. As shown, a relay 30 is shown as having its armature 31 arranged to shut off the air stream at 32 upon energization of its winding. The circuit of relay 30 contains contacts in two series related positions, so that unless both positions are closed together, the relay cannot operate. The first position is at the stationary contacts 27 and 28 or 28 and 29 of the switch 14, and the second position is at contacts 33 and 34, between which lies the arm 35, which is adapted to close the circuit at 33 and 34 periodically, under operation of a suitable electric motor (not shown) such, for example, as used for actuating windshield wipers. By means of this arrangement, the circuit of relay 30 cannot be completed, and therefore the air stream cannot be interrupted, unless motor 15 is moving, since motor 15 can move only when switch 14 closes contacts 27 and 28, or 28 and 29. Thus, air will be available for effecting a correction except for the predetermined periods of interruption, and these periods of interruption can occur at no time during which the motor 15 is still. By allowing interruption of the air stream only during periods during which motor 15 is operating, it will be evident that at no time will the air stream be closed when it might be needed in order to effect an adjustment of instrument 18. By adding this precaution, air is available whenever the vane 21 is in its neutral position and, therefore, if the vehicle should then tend to go off course, the pneumatic means will be at all times ready to effect the necessary correction.

It can be readily seen that by timing the flow of air and limiting it to a definite period, corrections of a definite value are possible in the instrument 18. For example, the air might be allowed to flow for two seconds every four seconds, making a half-degree correction during each period of air flow. This period has been taken only as an example, and it is obvious that any other suitable period may be utilized.

When a slight deflection of the coil 22 occurs, the air flowing over one side of the vane is effective through the moment arm to cause the vane to deflect to the limit of travel of the coil, allowing all the air to flow over one side only of the vane 21, giving a more forceful movement to the turbine 24 than would be obtained otherwise, causing the wheel 25 to make better and steadier contact with 27 and 28, or 28 and 29, through the switch arms 36 and 37, and preventing chattering of the contacts that might otherwise occur.

Figure 4:
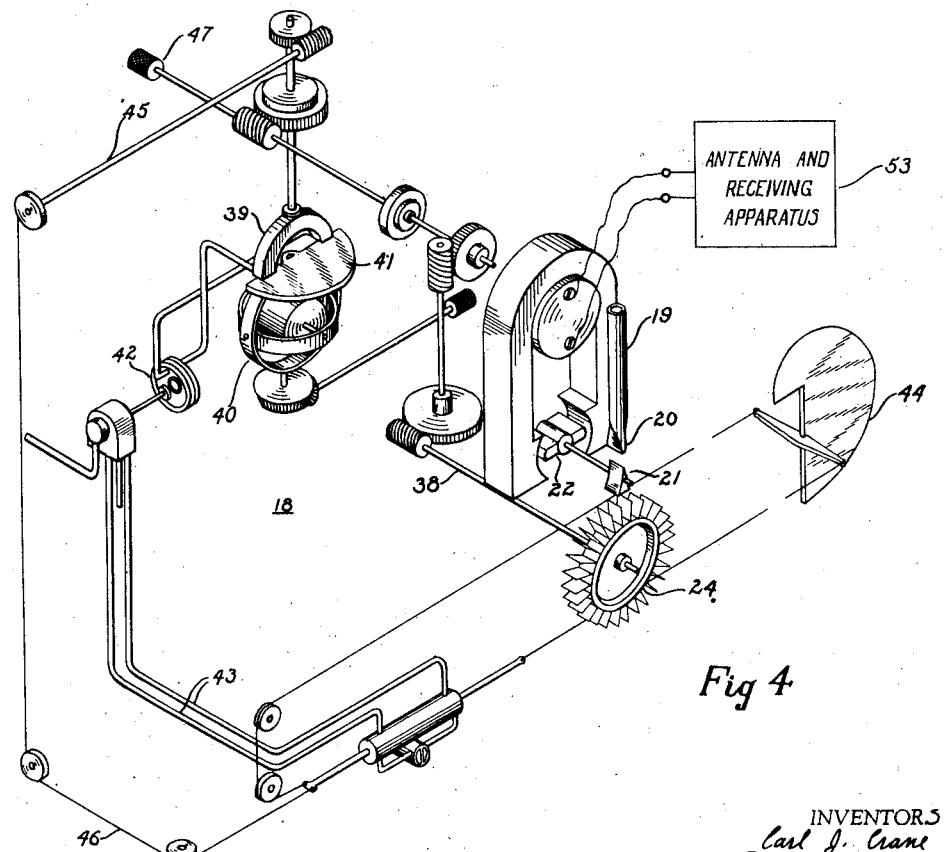

Fig. 4 shows an embodiment of the invention wherein the intermediate motors that have been shown in Figs. 1 to 3 are eliminated. The air flows over vane 21 in a manner which has been described already, to cause rotation of the turbine 24 when the moving coil 22 rotates the vane off center. The turbine is shown as being directly connected to a control member (shaft 38) of a conventional automatic pilot.

Shaft 38 leads through appropriate gearing means to the air pick off device 39 of the directional gyroscope 40. This gyroscope is effective through its associated mechanism to keep the vehicle on course, but frequently it needs a resetting, since the vehicle may be caused to deviate, as a result of wind or current, from the course to which the automatic pilot has been set. The air turbine 24 will accomplish this resetting directly in response to the guidance of the radio controlled vane when the direction finder shows that the vehicle is off course, as disclosed above.

Upon rotation of turbine 24, shaft 38, which is connected as an integral part of a conventional gyroscopic pilot, will cause rotation of the air pick-off device 39 of the gyroscope 40. Secured to the gyroscope 40 is the semi-circular disk 41 having its straight edge immediately under the arms of the pick-off device 39. In normal condition, the arms of the pick-off intercept equal amounts of air from two exhaust ports of the gyroscope 40, which ports are immediately beneath the arms of the pick-off device. Upon rotation of the air pick-off 39, the edge of the disk 41, which remains fixed relative to the gyroscope, causes unequal amounts of air to be intercepted by the two pick-off arms, resulting in a differential in pressure in the pick-off arms, which differential in pressure is transmitted to the conventional air relay 42, to effect a flow of oil in the system 43 in order to cause a deflection of the rudder 44 in a sense to put the vehicle on the proper course. When upon the proper course, the rudder must be returned to neutral position, and the conventional follow-up system indicated generally at 45, 46 brings the pick-off device 39 back to the position shown, when the rudder has allowed the turn to be completed. The rudder 44 has been shown as an aeroplane rudder, but, of course, it may be a ship rudder or other control surface or member.

It should be noted that in this embodiment of the invention, adjusting knob 47 affords manual control of the automatic pilot should it be desired to take the plane off the course for any reason, and turbine 24 will be overpowered and need not be disconnected while the manual change is being effected.

The direction finder may comprise the usual radio receiving apparatus, designated generally as 53. While no radio apparatus has been illustrated in Figs. 1, 2 and 3, it will be understood that the conventional apparatus may be connected to the indicator coil 22.

In Fig. 2 the air jet has been shown as a slot with its length at right angles to the edge of vane 21. With this arrangement, an accurate distribution of air on both sides of the vane can be had. This arrangement has certain advantages over a jet of circular cross section because it will be designed to have a smaller cross sectional area than a circular jet, thereby giving greater velocity to the same air stream. It will be readily seen that the slot is much easier to center over the vane than is a circular jet and also that the vane may be shortened axially since the air stream is restricted in width as compared to a stream issuing from a circular vane. A shorter vane is highly desirable, since the galvanometer or the dynamometer must be responsive to slight electrical currents, and will move more readily with the lighter vane. Furthermore, the shaft of the galvanometer coil can be made considerably shorter, which is advantageous, since the air stream will then exert a much less bending moment on the shaft of the coil, and cause a minimum of side thrust on the coil pivots. This type of jet has been shown in Fig. 2, but it will be understood that it may be used also in the embodiment shown in Figs. 3 and 4. Fig. 3 shows a jet of circular cross section while Fig. 4 shows a slot-shaped jet with its length paralleling the knife edge of the vane. This latter arrangement of the jet will permit all the air to be deflected to one side of the vane for a very small angular movement thereof, as will be seen readily. While only three forms of jets have been shown, it will be understood that any suitable conventional type of jet may be employed.

It has been pointed out in the description of the embodiments shown that the instrument to be changed or corrected may be an automatic pilot or a loop rotator assembly. It will be evident, however, to those skilled in the art, that a motor may be provided for rotating a loop, and another for correcting an automatic pilot, with a suitable switch being provided so that either instrument might be connected in circuit with the radio controlled element, such as the vane or pointer, and the contacts controlled thereby, as the pilot desires.

While only four embodiments of the invention have been illustrated and described, it is to be expressly understood that the invention is not limited thereto and that various changes may be made in the construction and arrangement of parts, as will now occur to those skilled in the art. While the embodiments shown in Figs. 2, 3 and 4 have been described as employing air means for rotating turbine 24, in certain instances it may be desirable to employ water, oil or steam, for example, or some other medium, rather than air. The arm 35 may be actuated by a pneumatic or other suitable motor rather than an electric motor. Particular attention has been called to the use of the invention in connection with aircraft and marine vessels, but it will be understood that the invention is not limited to use thereon, since in certain instances the same is adaptable for use on land vehicles such as tanks, for example. Other automatic pilots than the gyro pilot illustrated may be satisfactorily employed in connection with the control of various control surfaces, such as a rudder. Reference will be primarily had, therefore, to the appended claims for a definition of the limits of the invention.

What is claimed is:

1. In apparatus for the navigation of aircraft, a direction finder having a moving element, a pilot, motor means connected to said pilot to effect adjustment thereof, a fluid turbine having a fluid supply, switching means for controlling said motor means actuated by rotation of said turbine in either direction, air deflecting means carried by said element so as to be rotatable therewith and adapted to control rotation of said air turbine in accordance with movement of said element, and means for periodically interrupting the fluid supply.

2. In apparatus for the navigation of aircraft, a radio controlled moving coil, an automatic pilot, motor means connected to said pilot to effect adjustment thereof, an air turbine having an air inlet, switching means actuated by rotation of said turbine in either direction to control operation of said motor, air deflecting means carried by said coil so as to be rotatable therewith and adapted to control rotation of said air turbine in accordance with the movement of said coil, and means for periodically interrupting the air flow through said inlet, said interrupting means being effectual only during periods in which said motor means is in operation.

3. In apparatus of the class described, a left-right indicator having a moving element, an instrument to be adjusted, an electric motor for effecting adjustment of said instrument, an air turbine mounted adjacent said indicator, air supply means for said turbine, air deflecting means connected to said element so as to be movable therewith to control the flow of air to said turbine in accordance with its displacement, switching means in circuit with said motor, and means driven by said turbine for actuating said switching means to control operation of said motor, said air deflecting means being deflected to its limit of travel in response to slight movement of said element.

4. In apparatus of the class described, a rotatable element, a fluid deflecting vane secured to said element for rotation therewith, means for directing a fluid current against said vane, a turbine rotor, said vane deflecting said fluid current directly onto the blades of said turbine rotor, means yieldingly holding said rotor in a predetermined position, said rotor being adapted to be rotated in either direction against said yielding means by said current, the direction of rotation thereof being dependent upon the position of said element, an electric motor, a source of electric energy, and a circuit connecting said source and said motor including switch means controlled by said rotor.

5. In apparatus of the class described, a rotatable element, a fluid deflecting vane secured to said element for rotation therewith, means for directing a fluid current against said vane, a rotor, means yieldingly holding said rotor in a predetermined position, said rotor being adapted to be rotated in either direction against said yielding means by said current, the direction of rotation thereof being dependent upon the position of said element, an electric motor, a source of electric energy, a circuit connecting said source and said motor including switch means controlled by said rotor, and means for periodically interrupting said fluid current when said switch means is closed.

6. In apparatus of the class described, a rotatable element, a source of fluid under pressure, a fluid turbine having a rotor adapted to rotate in either direction, means for yieldingly holding said rotor against rotation in either direction, deflecting means on said element for directing said fluid against said rotor to rotate the latter in a direction dependent upon the position of said deflecting means, a reversible electric motor, a source of electric current, and means connecting said motor and said source, said connecting means including switch means whereby said motor may be energized for rotation in either direction depending upon the direction of rotation of said rotor.

7. In apparatus wherein an instrument is to be adjusted in accordance with the movement of a left-right indicator, a vane mounted on the indicator coil, an air supply means for creating an air jet, said supply means being mounted with the discharge end thereof adjacent said vane on one side of the latter, an air turbine mounted adjacent said vane on the other side of the latter, movement of said coil from a central position causing said vane to deflect said air jet directly onto said turbine so as to cause said turbine to rotate in a direction dependent upon the direction of movement of said coil, and means actuated by rotation of said turbine for effecting adjustment of said instrument.

8. In apparatus for the navigation of aircraft wherein adjustments of an instrument are to be effected in response to the movement of a radio controlled coil, motor means connected to said instrument, an air turbine, an air source discharging air on said turbine, means actuated by rotation of said turbine in either direction to control operation of said motor means, air deflecting means carried by said coil so as to be rotatable therewith to deflect the air discharge from said air source, said deflecting means being adapted to control rotation of said air turbine in accordance with the movement of said coil, and means for periodically interrupting the air flow from said source.

9. In apparatus for the navigation of aircraft wherein adjustments of an instrument are to be effected in response to the movement of a radio controlled coil, motor means connected to said instrument, an air turbine, an air source discharging air on said turbine, means actuated by rotation of said turbine in either direction to control operation of said motor means, air deflecting means carried by said coil so as to be rotatable therewith to deflect the air discharge from said air source, said deflecting means being adapted to control rotation of said air turbine in accordance with the movement of said coil, means for periodically interrupting the air flow from said source, and means connected to said motor means for causing said interrupting means to be effective only during periods in which said motor means is in operation.

10. In apparatus wherein an instrument is to be adjusted in accordance with the movement of a radio controlled coil, an air turbine having an air inlet and a rotor, said inlet directing an air stream toward said rotor, an air deflecting member carried by said coil and disposed between said inlet and said rotor in said air stream to cause rotation of the rotor when said coil is displaced from a central position, said member being mounted so as to be in a state of unstable equilibrium when said coil is in a central position and to tend to become deflected to its limit of travel in response to slight movement of said coil, and reversible means operatively connected to said instrument and said rotor for adjusting said instrument in accordance with the direction of rotation of said rotor.

11. In apparatus wherein an instrument is to be adjusted in accordance with the movement of a radio controlled coil, an air turbine having an air inlet and a rotor, said inlet directing an air stream toward said rotor, an air deflecting member carried by said coil and disposed between said inlet and said rotor in said air stream to cause rotation of the rotor when said coil is displaced from a central position, said member being mounted for rotation about an axis located below the center of gravity thereof so as to be in a state of unstable equilibrium when said coil is in a central position and to tend to become deflected to its limit of travel in response to slight movement of said coil, reversible means operatively connected to said instrument and said rotor for adjusting said instrument in accordance with the direction of rotation of said rotor, and means for periodically interrupting the air stream.

12. In apparatus for the automatic navigation of aircraft wherein an adjustment is effected in accordance with the deflection of a remotely controlled element in either direction from a predetermined neutral position, means adapted to apply the adjusting force and comprising a pneumatic motor, said means being controlled by the operation of said motor, means generating a fluid stream adapted to energize said motor, deflecting means for said stream mounted on said element so as to deflect the fluid stream in accordance with the movement of said element to produce a corresponding operation of said motor, and means for periodically interrupting said fluid stream.

13. In apparatus wherein an automatic pilot is adjusted in accordance with the deflection of the coil of a left-right indicator, an air turbine having an air inlet, means actuated by rotation of said turbine and adapted to adjust said pilot in accordance with said rotation, air deflecting means mounted on said coil for rotation therewith and adapted to control the air flow to said turbine so as to induce rotation in the latter in accordance with the movement of said coil, and means for periodically interrupting the fluid supply to said inlet.

CARL J. CRANE.
RAYMOND K. STOUT.